2 Sheets—Sheet 1.
S. LESSIG.
HORSE HAY-RAKE.
No. 6,963. Reissued Feb. 29, 1876.
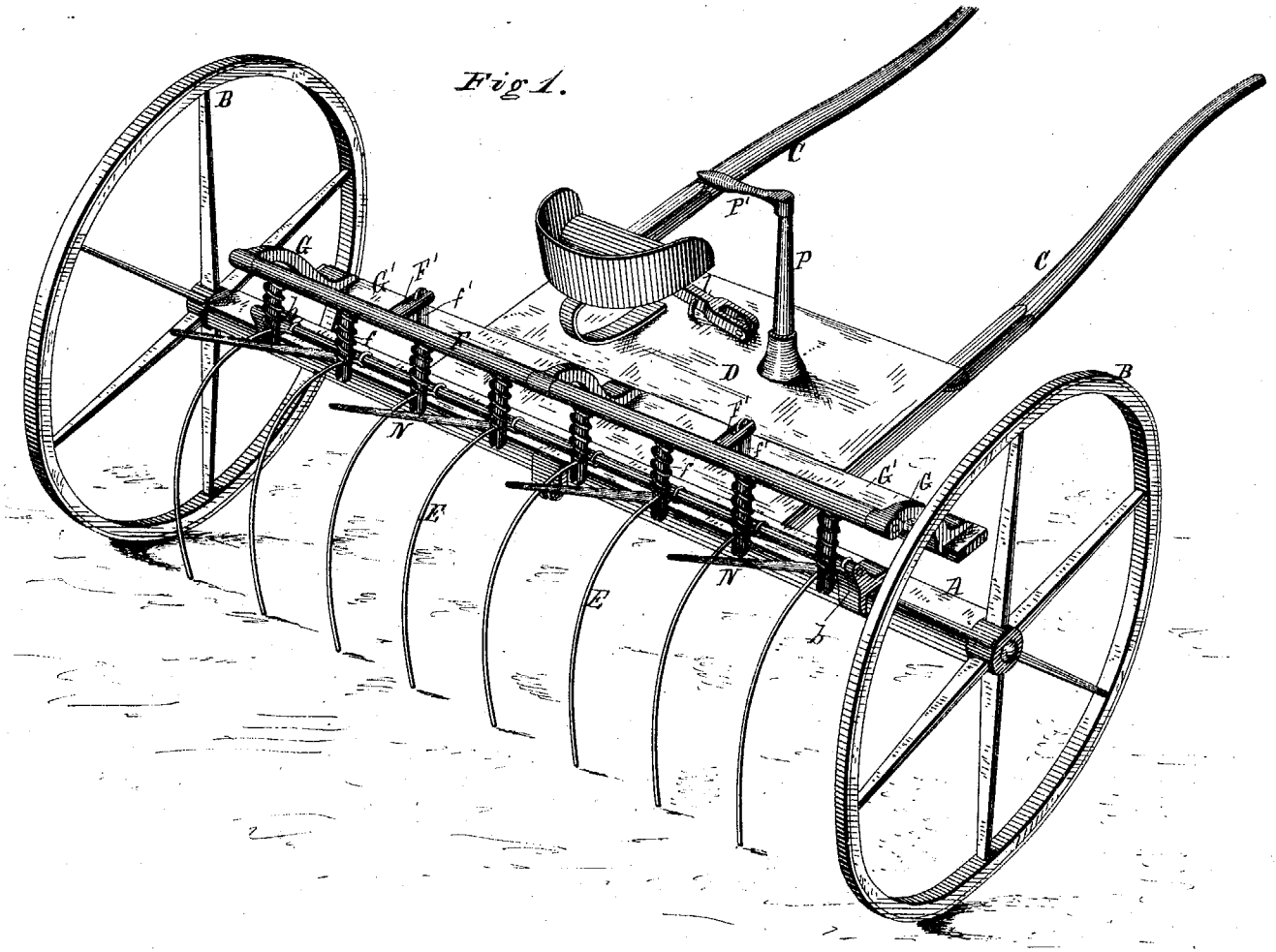
WITNESSES
Harry King.
Alex Mahon
By his Attorney
INVENTOR
Samuel Lessig
A. M. Smith
N. PETERS, PHOTO-LITHOGRAPHER, WASHINGTON, D. C.

2 Sheets—Sheet 2.
S. LESSIG.
HORSE HAY-RAKE.
No. 6,963. Reissued Feb. 29, 1876.
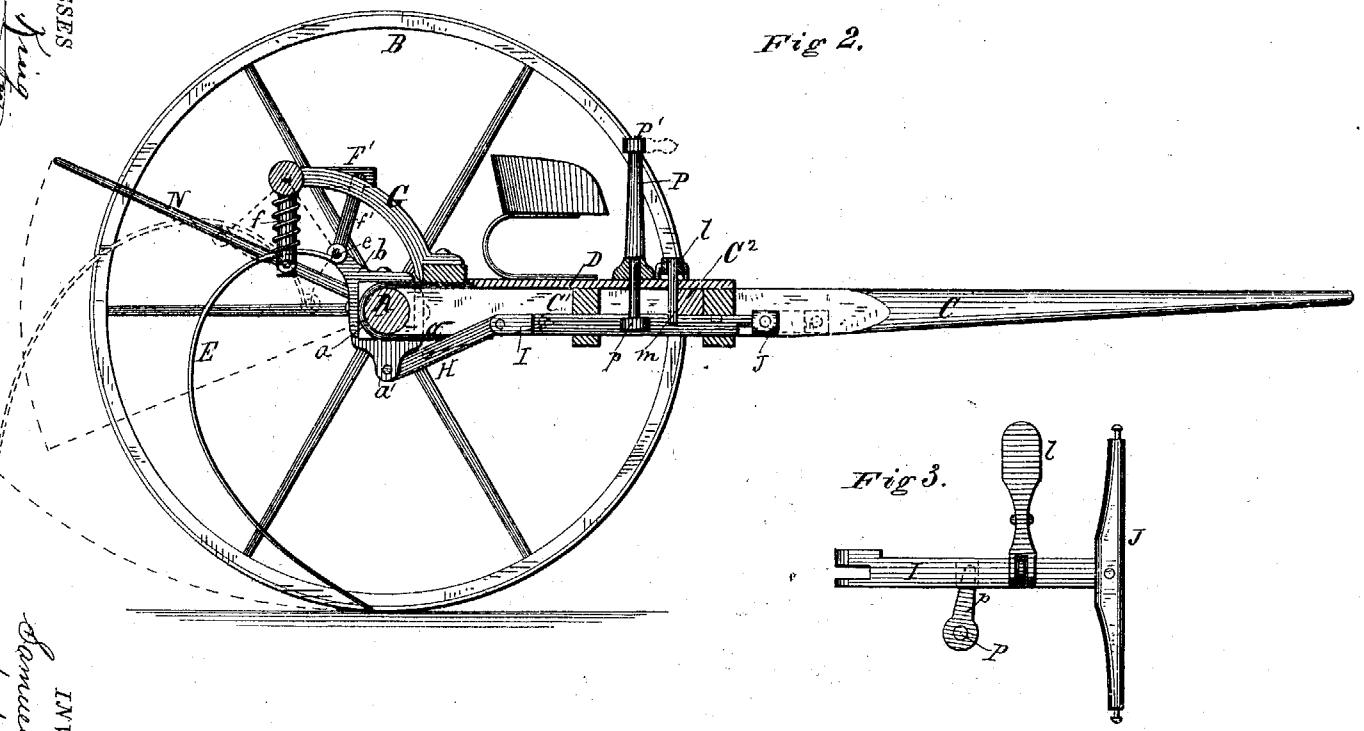
WITNESSES
Harry King
Alex Mahon
INVENTOR
Samuel Lessig
By his Attorney — A. M. Smith
N. PETERS, PHOTO-LITHOGRAPHER, WASHINGTON, D. C.

UNITED STATES PATENT OFFICE.

SAMUEL LESSIG, OF READING, PA., ASSIGNOR TO ADAM R. REESE.

IMPROVEMENT IN HORSE HAY-RAKES.

Specification forming part of Letters Patent No. 26,599 dated December 27, 1859; extended seven years; reissue No. 6,963, dated February 29, 1876; application filed January 28, 1876.

*To all whom it may concern:*

Be it known that I, SAMUEL LESSIG, of Reading, county of Berks and State of Pennsylvania, did invent certain new and useful Improvements in Horse Hay-Rakes, of which the following is a full, clear, and exact description, reference being had to the accompanying drawings, making a part of this specification, in which—

Figure 1 is a perspective view. Fig. 2 is a longitudinal section, and Fig. 3 is a detailed view of the draft-bar.

Similar letters of reference denote corresponding parts in all the figures.

The invention consists, first, in a novel manner of combining the power or direct draft of the team with, or applying it to, the rake-teeth, for raising the same, and causing them to discharge their load; and, second, in the means employed for resetting the rake-teeth, and transferring the power or draft of the team therefrom to the traction of the machine, as hereinafter explained.

In the accompanying drawings, A represents the main axle; B B, the driving-wheels, mounted and rotating freely on the ends of said axle, and C C, the thills, connected near their rear ends by transverse bars $C^1$ $C^2$, and forming, in connection therewith, the thill or tongue frame, upon which the driver's stand or platform D is mounted.

The rear ends of the thill-frame are connected with the axle A by means of straps *a*, which form a hinge-connection between the thills and axle, and permit the latter to receive a rotary or rocking movement, as will be explained. The axle A has angular brackets *b b* connected with it, one near each end, and extending to the rear and upward therefrom, and in the outer ends of these brackets the rake-head *e* is mounted, to which the upper or shank ends of the rake-teeth E are connected in such manner as to permit a free vibration of each tooth independently of the others. The teeth E in rear of the rake-head or axle pass through slotted pendent guides *f f* rigidly connected at their upper ends with a rock-shaft, F, mounted in suitable supporting-standards G, connected with a transverse bar, G′, on the thill-frame. Spiral springs surrounding the pendants *f* serve to hold the teeth down at the lower ends of the slots, while, at the same time, permitting them to yield to the obstructions which would be liable to injure or break them. The rock-shaft F has horizontal arms F′ rigidly connected with its forward face, and these arms are connected by pivoted links *f′* with the rake shaft or head *e* in such manner that, as the rake-head is vibrated by the rocking of the main axle, motion is imparted through the links *f′* and arms F′ to the rock-shaft F, vibrating the pendants *f*, and through said pendants, the teeth E. The axle A has an arm or lever, *a′*, extending downward from it at a point at or near midway of its length, and to the lower end of this arm the rear end of a link, H, is pivoted, the forward end of said link being pivoted to a sliding longitudinal bar, I, mounted in suitable guides in the transverse bars $C^1$ $C^2$, and to the forward end of the sliding bar the single-tree J is connected, as shown in Fig. 3, thus making bar I form the draft-rod or connecting-link between the team and the machine.

In front of the driver's seat K, and in convenient position to be acted upon by the foot of the driver, is a treadle, *l*, held up by the action of a spring for causing a pendent pin or stop, *m*, to engage with a notch or recess in the slide I for locking said bar against forward movement when the rake-teeth are set for gathering a load, as shown by the full lines in Fig. 2, the pin or stop *m* being held against the forward thrust or draft on the bar I by resting against the rear face of the bar $C^2$. In this position the draft operates through the thill-frame upon the axle and rake-head, and said frame becomes the draft-frame.

When a load has been gathered by the rake-teeth, and it is desired to discharge the same, the driver presses his foot upon the treadle *l*, overcoming the tension of the spring, and lifts the pin *m* out of engagement with the draft-slide I, which immediately slides forward through the action of the draft thereon, and, acting on the axle A through the link H and arm *a′*, imparts a backward rotation or rocking movement thereto. By this movement of the axle the rake-head *e* is vibrated or rocked downward, and, acting upon the pendants *f* through the links *f′* and rock-shaft F, causes said pendants to be vibrated, and thereby to rock or lift the teeth up out of the load, the parts assuming the position shown in dotted lines, Fig. 2.

Clearing rods or fingers N are connected with the axle, and by the rocking of the latter, as described, the fingers are vibrated downward, as indicated by the dotted lines, Fig. 2, assisting in the operation of clearing the rake-teeth from the load. For restoring the rake-teeth to position for gathering another load, a vertical shaft, P, is mounted in suitable bearings on the thill or draft frame, the upper end of which is provided with an arm or lever, P′, arranged in convenient position to be grasped and operated by the driver in his seat. The lower end of the shaft P has an arm, *p*, rigidly connected with it, the outer swinging end of which engages with the slide I, the arrangement being such that the driver, by operating the lever P, can force the slide I backward relatively to the thill or draft frame until the pin *m* engages therewith and locks it as before, by which movement the rake-teeth and clearers are restored to proper position for gathering another load, and through the pin *m* the draft is again transferred to the thill-frame, as described.

Having thus described how the invention may be carried out in practice, what is claimed, and sought to be secured by Letters Patent, is—

1. The combination, in a two-wheel horse-rake, of a rocking-head or tooth-support, and a draft-connection between said head or tooth-support, and the single-tree for raising the rake-teeth to discharge their load, by the direct draft of the team, substantially as described.

2. In a two-wheel horse-rake, having a center-draft connection between the tooth-support and the single-tree by which the rake is drawn, a lever, operated by the driver in his seat on the machine, for transferring the draft or power of the team to the raising of the rake-teeth, substantially as described.

3. In a two-wheel horse-rake, in which the teeth are raised to discharge their load by the direct center-draft of the team, a lever, controlled by the driver in his seat on the machine, for resetting the rake-teeth to gather another load.

4. The combination, in a two-wheel horse-rake, of a rocking rake-head and a vibrating clearer or clearer-rods, with the draft-rod or single-tree, whereby both are vibrated to discharge the gathered load by the direct draft of the team, as described.

SAM. LESSIG.

Witnesses:
F. PIERCE HUMMEL,
ISRAEL C. BRECKER.